C. F. BURGESS.
BATTERY HAND LAMP.
APPLICATION FILED APR. 8, 1919.
1,336,067.
Patented Apr. 6, 1920.
3 SHEETS—SHEET 1.
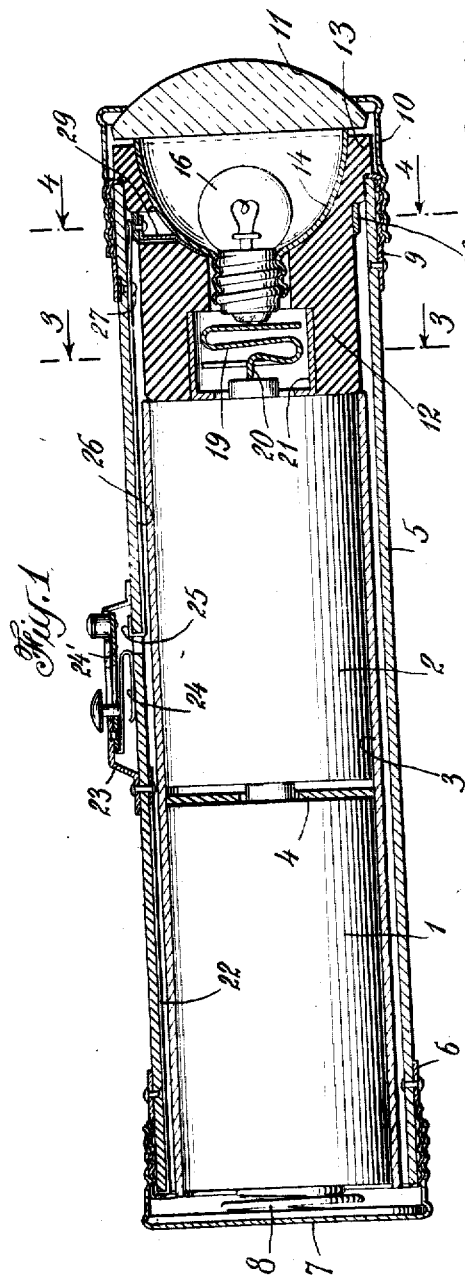
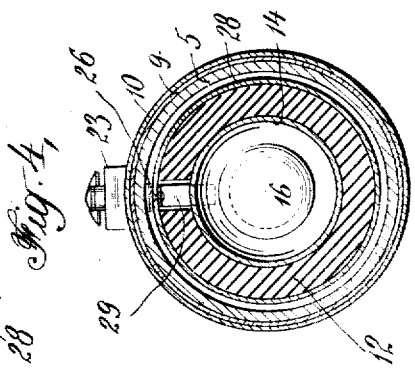
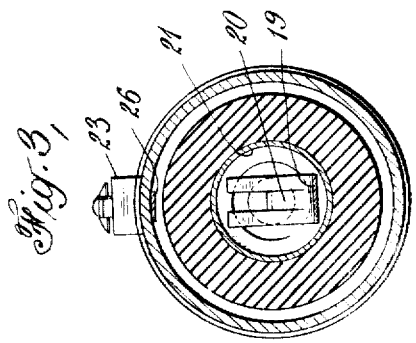
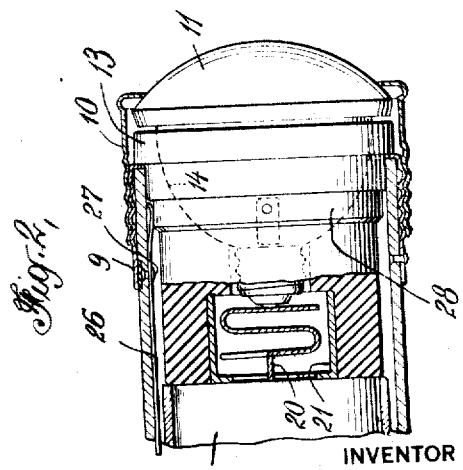
INVENTOR
Charles F. Burgess
BY
Pennie Davis Marvin & Edmonds
ATTORNEY C. F. BURGESS.
BATTERY HAND LAMP.
APPLICATION FILED APR. 8, 1919.
1,336,067.
Patented Apr. 6, 1920
3 SHEETS—SHEET 2.
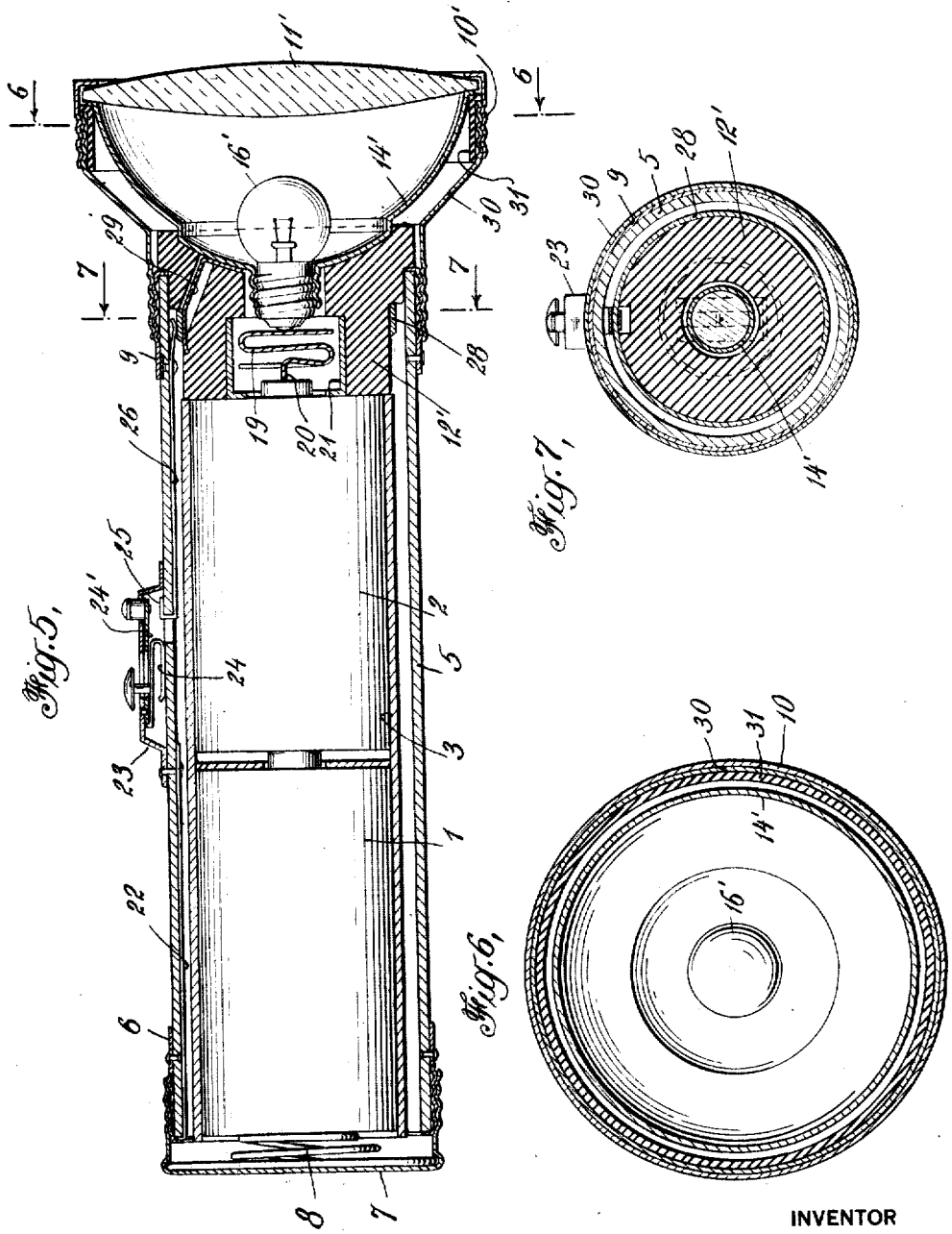
INVENTOR
Charles F. Burgess
BY
Connie Davis Marvin + Edmonds.
ATTORNEY

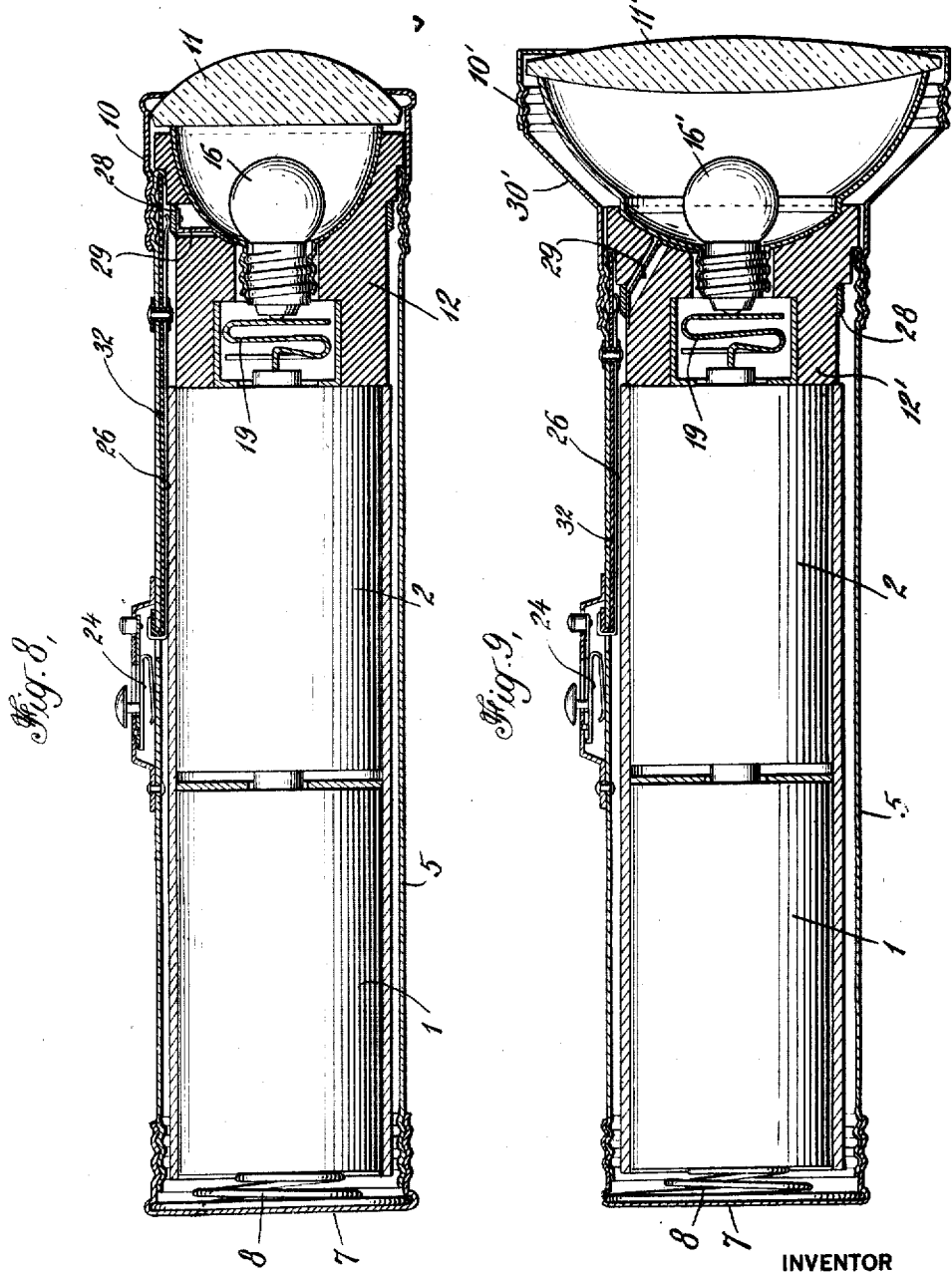

UNITED STATES PATENT OFFICE.

CHARLES F. BURGESS, OF MADISON, WISCONSIN, ASSIGNOR TO BURGESS BATTERY COMPANY, A CORPORATION OF WISCONSIN.

BATTERY HAND-LAMP.

1,336,067.      Specification of Letters Patent.      Patented Apr. 6, 1920.

Application filed April 8, 1919. Serial No. 288,476.

*To all whom it may concern:*

Be it known that I, CHARLES F. BURGESS, a citizen of the United States, residing at Madison, in the county of Dane, State of Wisconsin, have invented certain new and useful Improvements in Battery Hand-Lamps; and I do hereby declare the following to be a full, clear, and exact description of the invention, such as will enable others skilled in the art to which it appertains to make and use the same.

The present invention relates to battery hand lamps or flashlights of a type adapted for carrying in the pocket and provided with a minature lamp to which current may be delivered from a battery inclosed in the casing of the device. It has been found in practice that when these hand lamps are dropped there is danger that the batteries will crash through the base of the incandescent lamp and destroy it, and this is particularly the case when the battery is supported at its base on a coiled contact spring, for the spring permits enough movement of the battery in the case to give a relatively heavy blow when the battery strikes the lamp at the other end of the case. In many hand lamps of usual construction there is also danger of crushing the lamp by screwing on the bottom cap of the device so tightly as to crowd the batteries forcibly against the base of the lamp and in the same way the carbon electrode of a battery cell may be subjected to such pressure as to fracture the sealing material and force the electrode down into its container.

It is an object of the present invention to protect the lamp from fracture because of too much pressure on its base, whether this results from the impact of the battery thereon when the device is dropped, or results from the forcible crowding of the lamp and battery against one another. To attain this object, I make use of a bumper in the casing in such a way that it takes the direct thrust of the batteries and limits the pressure of contact on the base of the lamp. This bumper also shields the upper electrode from undue pressure.

It is a further object of the present invention, as applied to a tubular fiber lamp, to provide means of the general character disclosed in my Patent, No. 1,084,926, issued January 20, 1914, to prevent short-circuiting where the exposed metal ends of the lamp would otherwise be of opposite electrical polarity. This object is obtained by so inclosing certain parts of the electrical connections and by so insulating other parts that accidental contact across the exposed metal parts of the device will not be effective to light the lamp accidentally, as when the hand lamp is laid on a metal surface, or in contact with metal tools.

By making the impact block, above referred to, of insulating material, and by suitably arranging it in the end of the casing, it can serve the further function of supporting certain of the conductive elements, notably the lamp reflector, and will keep these elements out of contact with other metal parts, through which current might otherwise flow to accidentally light the lamp. When using the thrust block in an all metal case, this protection against accidental lighting of the lamp is not needed because all of the exposed metal parts are of the same electrical polarity, and the inherent danger of short-circuiting and thus accidentally wearing out the batteries is not present as it is in a fiber-tube lamp.

For a more complete understanding of these and other objects and advantages of the invention, reference is made to the following description which is to be taken in conjunction with the accompanying drawings, wherein—

Figure 1 is a sectional elevation of a tubular hand lamp;

Fig. 2 is a fragmentary section, showing the battery turned end for end;

Figs. 3 and 4 are transverse sections on the lines 3—3 and 4—4, respectively;

Fig. 5 is a sectional elevation of a fiber-tube lamp having a so-called miner's head;

Figs. 6 and 7 are transverse sections on the lines 6—6 and 7—7 of Fig. 5;

Fig. 8 is a sectional elevation of a metal tube lamp of cylindrical outline, equipped with the bumper of the present invention, and Fig. 9 is a similar view of a metal case lamp equipped with a miner's head.

In the embodiments illustrated in Figs. 1 to 4, inclusive, a plurality of battery cells 1 and 2, or other suitable number, are arranged end to end in the usual manner, within a pasteboard tube 3. Interposed between the cells is a paraffin washer 4 which serves to protect the lower cell in case of failure of its seal, and leakage of its electrolyte, and in case, through accident, the central or carbon electrode of the cell is forced down through the sealing material so that, except for the washer, the cell would be short-circuited through the zinc of the cell immediately above.

The battery is housed in a casing 5, here illustrated as comprising a tube of insulating material, preferably fiber, reinforced at its rear or bottom end with a threaded metal collar 6, to which is detachably secured an end cap 7, provided with a spiral spring 8 which bears against the naked bottom of the lowermost cell of the battery to establish electrical connection therewith.

The other end of the tubular casing is reinforced with an exposed metal collar 9 having its outer edge bent inward to overlap the front end of the insulating tube, and having a screw thread pressed therein for engagement with a threaded lens holder 10 which may be of metal and shaped to engage the edge of a glass lens 11. Within the front end of the tubular battery casing is a bumper 12 consisting of insulating material such as wood or fiber, and preferably having its front edge shaped to form a flange 13 which overlaps the end of the casing and covers up the inturned edge of metal collar 9. This bumper or block is recessed to receive a metal reflector 14 and the front edge of the reflector bears directly against lens 11 so that the reflector is securely forced against the block when lens holder 10 is screwed up tightly on collar 9.

An incandescent lamp 16 is threaded into a tubular extension of the metal reflector and has its base projecting down into an enlarged recess in the bumper, where the central terminal of the lamp may engage a spring 19 between the lamp and the central or carbon terminal of the topmost battery cell. Spring 19 preferably consists of a strip of metal shaped to approximate the form of the letter S, but has the bottom leaf thereof split, as shown in Fig. 3, to form a central tongue 20 which is bent downward to engage the cap of the carbon battery electrode.

As a means for preventing accidental displacement of the spring 19, while permitting some movement and adjustment thereof within the bumper, there is provided a metal thimble 21 fitted into the enlarged recess of the bumper, and provided with a flange serving as a guard to prevent accidental escape of spring 19. When spring 19 is provided with a bent tongue 20, as above described, there is the advantage that with no battery in the casing, the lower leaf of spring 19 will rest against the flange of the guard and tongue 20 will project downward through the opening of the guard so that if the battery is put in bottom end up, as illustrated in Fig. 2, there will still be effective engagement with it by spring 19. At the other end of such an inverted battery, the coil spring 8 will engage the carbon electrode. This is of advantage when the hand lamp is in the hands of inexperienced users, or when use is made of the batteries of United States Patent issued to me June 27, 1916, No. 1,188,408.

With the parts assembled as illustrated in Fig. 1, the battery is held against the bumper block 12 by the coil spring 8, and the spring 19 establishes electrical connection to the lamp, but limits the pressure to which the base of the lamp is subjected. If the device is dropped, the battery can oscillate in the casing without subjecting the lamp to destructive impact and similarly a too tight adjustment of the bottom cap 7 is without injurious effect on the lamp, and cannot crush the upper carbon electrode through its sealing material and into battery cell 2.

This same idea of protecting the lamp and the battery seal is present in the embodiments illustrated in Figs. 5, 8 and 9.

As a means for establishing electrical connection from the bottom of the battery to the lamp, I make use of a conductor 22 contacting with metal collar 6 and therefore connected with spring 8. This conductor 22 is riveted to a housing 23, mounted near the middle of the tubular casing, and may be provided with a sliding contact device of the type disclosed and claimed in the patent to Maisel, No. 1,082,887, issued December 30, 1913. This device comprises a U-shaped strip of resilient metal having its inner leg 24 arranged to slide along the outer face of the fiber-tube into and out of contact with a lug 25. Such a sliding contact device may be supplemented by an instantaneous contact device, comprising a resilient metal strip 24' riveted to the top of housing 23, and having a push button whereby its free end may be forced down into engagement with lug 25, as will be apparent from the drawing. Other well known devices of proper construction may, of course, be used for completing the connection between conductor 22 and lug 25. This lug 25 consists of the clenched end of a metal strip 26 which extends along the side of the insulating tube between it and the bumper block 12, and has its front end secured by an insulated rivet 27 and bent inward beyond the rivet to make yielding engagement with a metal ring 28 which is driven on over a reduced portion of block 12, and which carries riveted thereto a spring finger 29 normally lying in the bottom of the recess of that block, and so making contact with reflector 14 when that reflector is crowded home by lens 11.

With this arrangement of parts, the lens, the reflector and the lamp are all readily removable from the front end of the casing, and the bumper 12 can then be pulled out to give access to the batteries as when the bottom cap 7 has corroded tight on its ring 6 and the batteries have to be renewed through the front end of the tube. Reassembling of the parts is easy for, since the connection between strip 26 and the lamp is effected through a ring 28, the bumper can be slipped into position without any thought as to alinement with strip 26. With the block in position, as shown in the drawing, it fits rather snugly within the extreme front end of the fiber tube, and so gives rigidity to the tube and stability to the reflector and its associated parts.

With this arrangement of parts and of circuits, the outer terminal of lamp 16 is electrically connected with reflector 14 and through that and finger 29, with strip 26, but normally is insulated from all other parts of the device, and particularly is insulated from all exposed metal parts such as collar 9 and lens holder 10, and consequently an accidental lighting of the lamp by bridging its exposed metal parts is not possible.

To renew the batteries through the bottom end, it is only necessary to remove cap 7, for the batteries may then be slipped out and new ones put in their place, and even though the new ones be dropped in carelessly, they cannot strike a hard blow against the lamp base, but will be stopped by the bumper 12 against which the battery container bears when the central electrode enters the recess in the bumper. In the modification illustrated in Figs. 5 to 7, inclusive, wherein like parts are numbered to correspond to Fig. 1, the collar 9 on the front end of the casing has threaded engagement with a flaring collar 30, and the latter, together with a flanged member 10′, serve to hold lens 11′, and reflector 14′ to their seats. Reflector 14′ is seated in the recessed front end of the bumper or block 12′, and has its outer edge insulated from the adjacent metal parts 10′ and 30 by means of a fiber ring 31 which is provided with an outwardly extending flange lying over the outer edge of collar 30 and forming a seat against which the edge of the reflector is clamped.

The operation of this modification, together with its advantages, will be clear from the foregoing description of the device shown in Fig. 1.

Figs. 8 and 9 show hand lamps in which the casing is entirely of metal, and therefore in which no metal strip need be provided for connecting bottom cap 7 with the housing of the switch or contact device. However, the front strip 26 must be insulated from the metal tube and this result is attained by a layer 32 of paper or the like, underlying the strip.

Other details of the construction follow closely those of Figs. 1 and 5, and will be apparent from the drawings.

I claim:

1. In a tubular hand lamp, the combination of a casing, a battery therein, a spring pressing against the bottom of said battery to establish electrical connection therewith, a lens and a reflector at the other end of said casing, a lamp secured in said reflector, a bumper in said casing between the battery and the reflector, a spring connecting one terminal of said battery to the inner terminal of said lamp, a ring encircling said bumper, a finger connecting said ring with said reflector and means for completing the connection between said bottom spring and said ring.

2. In a hand lamp, the combination of a tubular casing, a battery therein, a reflector at the front end of said casing, a lamp for said reflector, a bumper protecting said lamp against the impact of said battery, a ring encircling said bumper and having electrical connection with said reflector, a lens and lens support which clamps said bumper against the end of said casing, a switch mechanism on the side of the casing and a stationary conductive strip for conveying current from said switch mechanism to said lamp.

3. In a tubular hand lamp, the combination of a tubular casing having a metal end, a battery in said casing and removable through either end thereof, a detachable metal cap closing the rear end of said casing by the removal of which said battery may be withdrawn through said rear end, a spring carried by said cap and engaging the bottom of said battery and establishing electrical connection therewith, a lamp connected with the other end of said battery, a conductive member wherein said lamp is seated, a lens for said lamp, supporting means for said lens secured to said metal casing end, said conductive member being insulated from said lens-supporting means, a switch near the center of said casing, a bumper bearing against said supporting member, a conductive ring encircling said bumper and electrically connected with said conductive member wherein said lamp is seated, and a stationary conductive strip leading from said switch to said conductive member, said strip being insulated from said metal end and from said lens holder.

4. In a tubular hand lamp, the combination of a casing having an exposed metal end, a battery therein, a spring pressing against the bottom of said battery to establish electrical contact therewith, a lens and a reflector at the other end of said casing, a lamp for said reflector, a bumper contacting with said reflector to relieve the inner lamp terminal of undue pressure from the battery, a ring encircling said bumper and electrically connected with said reflector, a spring establishing a battery connection to the inner terminal of the lamp, and stationary conductors with an intervening switch forming contacting means for completing the connection between said battery and said lamp.

5. In a tubular hand lamp, the combination of a casing, a battery therein, a spring pressing against the bottom of said battery to establish electrical connection therewith, a reflector at the other end of said casing, a lamp secured in said reflector, an insulating cylindrical bumper secured to said casing, a spring connecting the inner terminal of said battery to said lamp, a ring encircling said bumper and electrically connected to said reflector, stationary conductive strips provided with a switch for completing the connection between said battery and said lamp, a lens for said lamp and a detachable lens holder securing said lens to said casing, said bumper being in position to insulate said reflector from adjacent metal parts to prevent accidental lighting of the lamp through accidental connection of exposed metal parts of the device.

In testimony whereof I affix my signature.

CHARLES F. BURGESS.